United States Patent
Hu et al.

(10) Patent No.: US 9,866,117 B2
(45) Date of Patent: Jan. 9, 2018

(54) POWER SUPPLY WITH ADAPTIVE-CONTROLLED OUTPUT VOLTAGE

(71) Applicant: Cree, Inc., Durham, NC (US)

(72) Inventors: Yuequan Hu, Morrisville, NC (US); Daniel Pope, Morrisville, NC (US)

(73) Assignee: CREE, INC., Durham, NC (US)

( * ) Notice: Subject to any disclaimer, the term of this patent is extended or adjusted under 35 U.S.C. 154(b) by 297 days.

(21) Appl. No.: 13/792,457

(22) Filed: Mar. 11, 2013

(65) Prior Publication Data

US 2014/0253056 A1 Sep. 11, 2014

(51) Int. Cl.
| | |
|---|---|
| H02M 3/158 | (2006.01) |
| H05B 33/08 | (2006.01) |
| H02M 1/42 | (2007.01) |
| H02M 3/157 | (2006.01) |
| H02M 1/00 | (2006.01) |

(52) U.S. Cl.
CPC ........ *H02M 3/158* (2013.01); *H05B 33/0815* (2013.01); *H05B 33/0827* (2013.01); *H02M 1/4258* (2013.01); *H02M 3/157* (2013.01); *H02M 2001/007* (2013.01); *Y02B 20/347* (2013.01); *Y02B 70/126* (2013.01)

(58) Field of Classification Search
CPC ... H02M 3/158; H05B 37/02; H05B 33/0815; H05B 33/0845; H05B 33/0818; H05B 33/0827; H05B 33/0851
USPC ............ 315/297, 224, 312, 307, 186, 200 R; 323/205, 266
See application file for complete search history.

(56) References Cited

U.S. PATENT DOCUMENTS

| | | | |
|---|---|---|---|
| 5,903,138 A | 5/1999 | Hwang et al. | |
| 6,272,025 B1* | 8/2001 | Riggio et al. | ................... 363/24 |
| 7,420,335 B2* | 9/2008 | Robinson et al. | ............ 315/224 |
| 7,759,881 B1* | 7/2010 | Melanson | ..................... 315/307 |
| 8,471,488 B1* | 6/2013 | Hopkins et al. | ............. 315/247 |
| 8,669,721 B2* | 3/2014 | Watanabe et al. | ............ 315/307 |
| 8,912,778 B1* | 12/2014 | Bennett et al. | ............... 323/283 |
| 2005/0218838 A1* | 10/2005 | Lys | ............................... 315/291 |
| 2006/0172183 A1 | 8/2006 | Leung et al. | |
| 2007/0188114 A1* | 8/2007 | Lys et al. | ..................... 315/308 |
| 2008/0018261 A1* | 1/2008 | Kastner | ........................ 315/192 |
| 2008/0024104 A1* | 1/2008 | Yamada | ........................ 323/283 |

(Continued)

OTHER PUBLICATIONS

Energy Star* Version 5.0 (Feb. 2009) Published by Intel with technical collaboration from the U.S. Environmental Protection Agency, 91 pages.

*Primary Examiner* — Douglas W Owens
*Assistant Examiner* — Wei Chan
(74) *Attorney, Agent, or Firm* — Sage Patent Group

(57) ABSTRACT

A power supply circuit includes a pre-regulator configured to receive an input voltage and to generate an output voltage, and a switching current regulator coupled to an output of the pre-regulator and configured to regulate a level of current supplied to an output load. The switching current regulator is controlled by a switching signal having a duty cycle. The circuit further includes a controller that generates the switching signal. The controller monitors the duty cycle of the switching signal and controls a level of the output voltage generated by the pre-regulator by providing a control signal in response to the duty cycle of the switching signal.

12 Claims, 6 Drawing Sheets

(56) References Cited

U.S. PATENT DOCUMENTS

| | | | |
|---|---|---|---|
| 2008/0164828 A1* | 7/2008 | Szczeszynski | G05F 1/46 315/300 |
| 2009/0102445 A1* | 4/2009 | Ito et al. | 323/283 |
| 2009/0128045 A1* | 5/2009 | Szczeszynski | H05B 33/0815 315/185 R |
| 2009/0219003 A1* | 9/2009 | Yang | 323/283 |
| 2009/0327786 A1 | 12/2009 | Carroll et al. | |
| 2010/0026208 A1* | 2/2010 | Shteynberg | H05B 33/0815 315/297 |
| 2010/0033150 A1* | 2/2010 | Irissou et al. | 323/284 |
| 2010/0156315 A1* | 6/2010 | Zhao | H05B 33/0818 315/294 |
| 2010/0164403 A1* | 7/2010 | Liu | H05B 33/086 315/297 |
| 2010/0165669 A1* | 7/2010 | Li | 363/21.04 |
| 2010/0308733 A1* | 12/2010 | Shao | 315/119 |
| 2011/0006691 A1* | 1/2011 | Blaha et al. | 315/185 R |
| 2011/0037414 A1* | 2/2011 | Wang et al. | 315/297 |
| 2011/0050185 A1* | 3/2011 | Notman et al. | 323/271 |
| 2011/0133662 A1* | 6/2011 | Yan et al. | 315/224 |
| 2011/0188270 A1* | 8/2011 | Schmid et al. | 363/21.12 |
| 2011/0248640 A1* | 10/2011 | Welten | 315/210 |
| 2011/0248648 A1* | 10/2011 | Liu | G09G 3/3406 315/294 |
| 2012/0049824 A1* | 3/2012 | Chen | H02M 3/156 323/283 |
| 2012/0081018 A1* | 4/2012 | Shteynberg et al. | 315/200 R |
| 2012/0133299 A1* | 5/2012 | Capodivacca | H05B 33/0827 315/297 |
| 2012/0139423 A1* | 6/2012 | Angelin et al. | 315/127 |
| 2012/0139433 A1* | 6/2012 | Yan et al. | 315/206 |
| 2012/0153866 A1* | 6/2012 | Liu | 315/294 |
| 2012/0242247 A1* | 9/2012 | Hartmann et al. | 315/294 |
| 2012/0262079 A1* | 10/2012 | Lin et al. | 315/206 |
| 2012/0268023 A1* | 10/2012 | Yan et al. | 315/200 R |
| 2012/0306459 A1* | 12/2012 | Ho et al. | 323/210 |
| 2013/0082675 A1* | 4/2013 | Capodivacca et al. | 323/283 |
| 2013/0082676 A1 | 4/2013 | Capodivacca et al. | |
| 2013/0113375 A1* | 5/2013 | Leung et al. | 315/85 |
| 2013/0119951 A1 | 5/2013 | Sreenivas et al. | |
| 2013/0169172 A1* | 7/2013 | Kesterson | H05B 33/0815 315/186 |
| 2014/0132236 A1* | 5/2014 | Darmawaskita et al. | 323/283 |
| 2014/0167637 A1* | 6/2014 | Lin et al. | 315/224 |
| 2014/0184187 A1* | 7/2014 | Hwang et al. | 323/283 |
| 2014/0253079 A1* | 9/2014 | Ding et al. | 323/283 |

* cited by examiner

POWER SUPPLY WITH ADAPTIVE-CONTROLLED OUTPUT VOLTAGE

BACKGROUND

The present disclosure generally relates to a power supply, and more particularly, to an LED driver circuit with adaptive controlled output voltage for driving LEDs.

As a result of continuous technological advances that have brought about remarkable performance improvements, light-emitting diodes (LEDs) are increasingly finding use in applications such as traffic lights, automobiles, general-purpose lighting, and liquid-crystal-display (LCD) backlighting. As solid state light sources, LED lighting is poised to replace existing lighting sources, such as incandescent and fluorescent lamps, in the future since LEDs do not contain mercury, exhibit fast turn-on and dimmability, have long life-times, and require low maintenance. Compared to fluorescent lamps, LEDs can be more easily dimmed either by linear dimming or pulse-width modulated (PWM) dimming.

A light-emitting diode (LED) is a semiconductor device that emits light when its p-n junction is forward biased. While the color of the emitted light primarily depends on the composition of the material used, its brightness is directly related to the current flowing through the p-n junction. Therefore, a driver circuit providing a constant current is desired.

FIG. 1 shows a lighting apparatus including a plural number of LED strings 1 to n driven by constant currents provided by current regulators 1 to n. Each current regulator receives an input voltage $V_{IN}$ and provides the (same or different) current through respective LED strings, each of which includes at least one LED. LED strings 1 to n may generate lights of the same color or different color depending on the color output requirements of the lighting apparatus.

A current regulator may be a linear current regulator, such as the regulators 16-1 to 16-$n$ shown in FIG. 2 or a switching current regulator, such as the regulators 18-1 to 18-$n$ shown in FIG. 3. A linear current regulator generally has lower cost than a switching regulator. However a linear current regulator may have lower efficiency than a switching regulator depending on the voltage drop across the regulator.

In FIGS. 2 and 3, a power source 12, which may be DC or AC, provides an input voltage for a switching pre-regulator 14, which regulates an output voltage $V_B$. Each current regulator 16-1 to 16-$n$, 18-1 to 18-$n$, receives the voltage $V_B$ and regulates the driving current through a respective LED string. The power source 12 can, for example, be a battery or an AC source from the utility power line. The switching pre-regulator 14 can be any type of DC/DC or AC/AC converter, and can be isolated or non-isolated depending on the application requirement.

SUMMARY

A power supply circuit according to some embodiments includes a voltage regulator configured to receive an input voltage and to generate an output voltage, and a switching current regulator coupled to an output of the voltage regulator and configured to regulate a level of current supplied to an output load. The switching current regulator is controlled by a switching signal having a duty cycle. The circuit further includes a controller that generates the switching signal. The controller monitors the duty cycle of the switching signal and controls a level of the output voltage generated by the voltage regulator in response to the duty cycle of the switching signal.

The voltage regulator receives a control signal and sets the level of the output voltage in response to the control signal, and the controller supplies the control signal to the voltage regulator and controls the level of the output voltage by changing a level of the control signal.

The controller may reduce the level of the output voltage generated by the voltage regulator in response to determining that the duty cycle of the switching signal is below a threshold value.

The controller may further compare the duty cycle of the switching signal to a second threshold value, and maintain the level of the output voltage in response to determining that the duty cycle of the switching signal is greater than the second threshold value.

The first threshold value may be lower than the second threshold value.

The controller may reduce the level of the control signal in response to determining that the duty cycle of the switching signal is below the threshold value, causing the voltage output by the voltage regulator to drop and causing the duty cycle of the switching signal to increase.

The switching current regulator may include a switch having a control terminal that receives the switching signal, a diode coupled between the switch and the output of the voltage regulator, an inductor coupled between the switch and the output load, and a current sensing resistor coupled between the switch and a ground terminal.

In some embodiments, the switching current regulator may include a switch having a control terminal that receives the switching signal and having a first terminal coupled to the output of the voltage regulator and having a second terminal coupled to the output load, a diode coupled to the second terminal of the switch, an inductor coupled between the diode and the output load, and a current sensing resistor coupled between the inductor and a ground terminal.

In further embodiments, the switching current regulator may include a switch having a control terminal that is configured to receive the switching signal and having a first terminal coupled to the output of the voltage regulator and having a second terminal coupled to the output load, a diode coupled to the second terminal of the switch and to a ground terminal, an inductor to the output load, and a current sensing resistor coupled between the inductor and a ground terminal.

The power supply may further include a voltage divider that is coupled to the output of the voltage regulator and that generates a feedback voltage $V_{FB}$, and an error amplifier that compares a reference voltage VREF generated by the controller to the feedback voltage VFB and responsively generates a control signal. An output of the error amplifier may be coupled to a feedback input of the voltage regulator, and the voltage regulator may set the level of the output voltage in response to the control signal.

The controller may generate the reference voltage $V_{REF}$ in response to the duty cycle of the switching signal.

The voltage regulator may include a single stage power factor correcting flyback and the switching current regulator may include a buck current regulator.

A power supply circuit according to some embodiments includes a voltage regulator that receives an input voltage and generates an output voltage, and a plurality of switching current regulators coupled to an output of the voltage regulator and that regulate levels of current supplied to respective output loads. The switching current regulators are controlled by switching signals having respective duty cycles, and the circuit further includes a controller that generates the switching signals. The controller monitors the duty cycles of the switching signals and controls a level of the output voltage generated by the voltage regulator in response to the a highest one of the duty cycles of the switching signals.

The voltage regulator may receive a control signal and set the level of the output voltage in response to the control signal, and the controller may supply the control signal to the voltage regulator and control the level of the output voltage by changing a level of the control signal.

The controller may reduce the level of the output voltage generated by the voltage regulator in response to determining that the highest one of the duty cycles of the switching signals is below a threshold value.

The controller may further compare the duty cycles of the switching signals to a second threshold value, and maintain the level of the output voltage in response to determining that the highest one of the duty cycles of the switching signals is greater than the second threshold value.

Some embodiments provide methods of operating a power supply circuit including a voltage regulator that receives an input voltage and generates an output voltage and a switching current regulator that regulates a level of current supplied to an output load and that is controlled by a switching signal having a duty cycle. The methods include monitoring the duty cycle of the switching signal, and controlling a level of the output voltage generated by the voltage regulator in response to the duty cycle of the switching signal.

The voltage regulator may receive a control signal and set the level of the output voltage in response to the control signal, and the methods may further include supplying the control signal to the voltage regulator, and controlling the level of the output voltage by changing a level of the control signal.

The methods may further include changing the level of the control signal to reduce the level of the output voltage generated by the voltage regulator in response to determining that the duty cycle of the switching signal is below a threshold value.

The methods may further include comparing the duty cycle of the switching signal to a second threshold value, and controlling the level of the control signal to maintain the level of the output voltage in response to determining that the duty cycle of the switching signal is greater than the second threshold value.

The methods may further include controlling the level of the control signal to further decrease the level of the output voltage in response to determining that the duty cycle of the switching signal is not greater than the second threshold value.

A power supply circuit according to further embodiments includes a voltage regulator that receives an input voltage and generates an output voltage, and a plurality of switching current regulators that regulate levels of current supplied to respective output loads, wherein the switching current regulators are controlled by switching signals having respective duty cycles. The circuit further includes a controller that generates the switching signals and that decreases the output voltage generated by the voltage regulator until a highest one of the duty cycles of the switching signals is greater than a threshold value.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings.

DETAILED DESCRIPTION

Embodiments of the present inventive concepts are described herein with reference to the accompanying drawings. The inventive concepts may, however, be embodied in many different forms and should not be construed as limited to the embodiments set forth herein. Rather, these embodiments are provided so that this disclosure will be thorough and complete, and will fully convey the scope of the inventive concepts to those skilled in the art. Like numbers refer to like elements throughout.

Embodiments of the present inventive concepts provide methods and apparatus for controlling a voltage level output by a pre-regulator in a switching current regulator. By controlling the level of the voltage output by the pre-regulator, it may be possible to keep the switching duty cycle of a control switch at a desired level.

Figure 1:
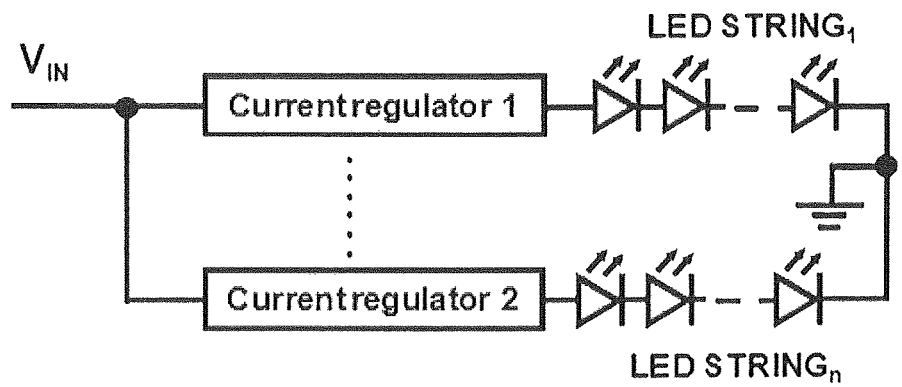
FIG. 1 is a schematic block diagram of a solid state lighting apparatus including multiple light emitting diode strings.
Figure 2:
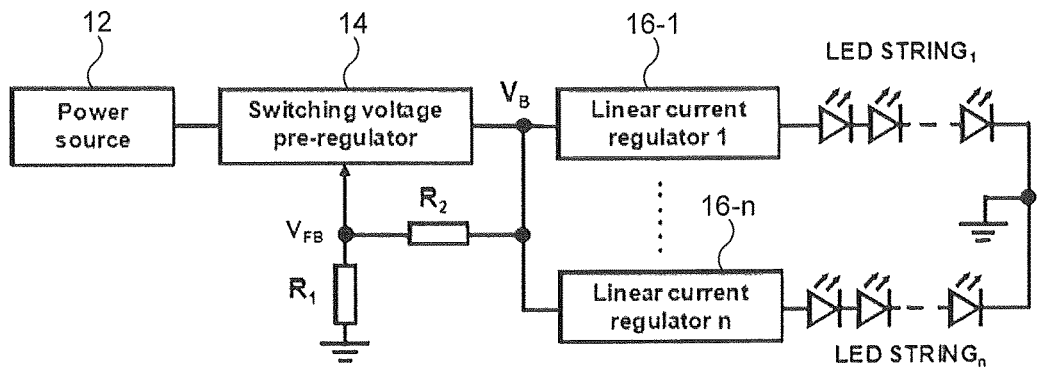
FIG. 2 is a schematic block diagram of a solid state lighting apparatus including multiple light emitting diode strings, a pre-regulator and linear current regulators for each string.
Figure 3:
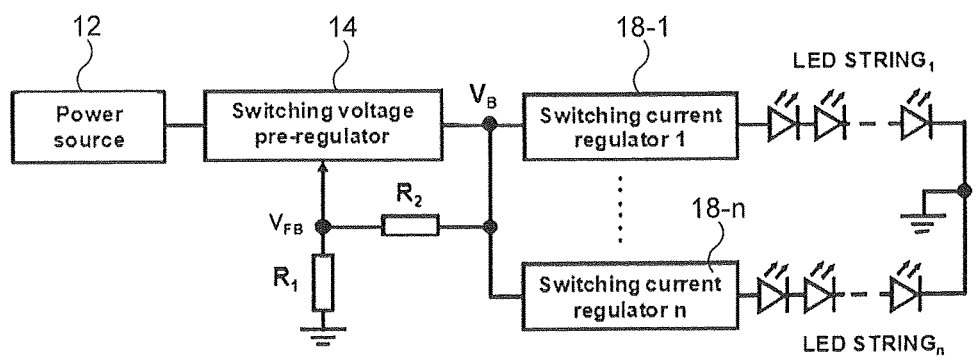
FIG. 3 is a schematic block diagram of a solid state lighting apparatus including multiple light emitting diode strings, a pre-regulator and switching current regulators for each string.
Figure 4:
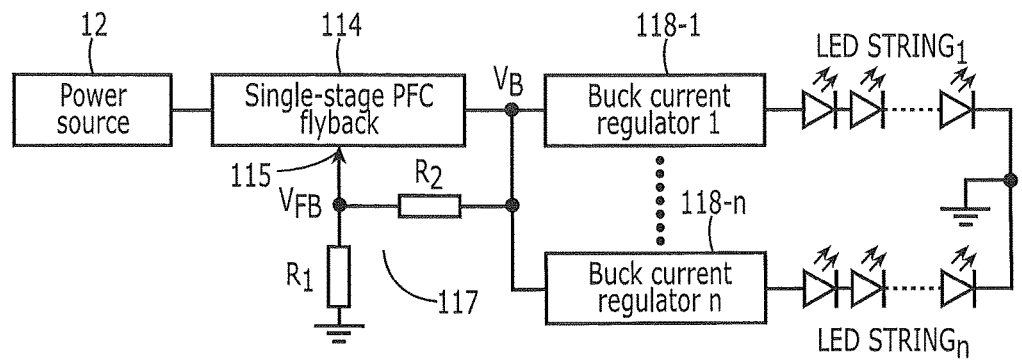
FIG. 4 is a schematic block diagram of a solid state lighting apparatus including multiple light emitting diode strings, a single stage flyback pre-regulator and buck current regulators for each string.

FIG. 4 shows a switching mode LED driver using buck converters 118-1 to 118-n as the current regulators for LED strings 1 to n. The pre-regulator is a single-stage power-factor-correcting (PFC) flyback 114. Buck converters 118-1 to 118-n step down the input voltage $V_B$ and provide a constant current to the respective LED string. The voltage $V_B$ is generally set by an internal reference $V_{REF}$ of the controller of the pre-regulator 114 which is tied to a feedback voltage $V_{FB}$ provided at a feedback input 115 of the pre-regulator 114 by an external voltage divider 117 including R1 and R2 as shown in FIG. 4. The voltage $V_B$ can be expressed by Equation (1).

$$V_B = \left(1 + \frac{R_2}{R_1}\right) V_{REF} \tag{1}$$

That is, the pre-regulator 114 sets the internal reference voltage $V_{REF}$ to a value equal to the value $V_{FB}$ input from the voltage divider formed by $R_1$ and $R_2$. The level of the voltage $V_B$ is generated based on the value of $V_{REF}$. Changing the level of the feedback voltage $V_{FB}$ will therefore change the value of the voltage $V_B$.

Figure 5:
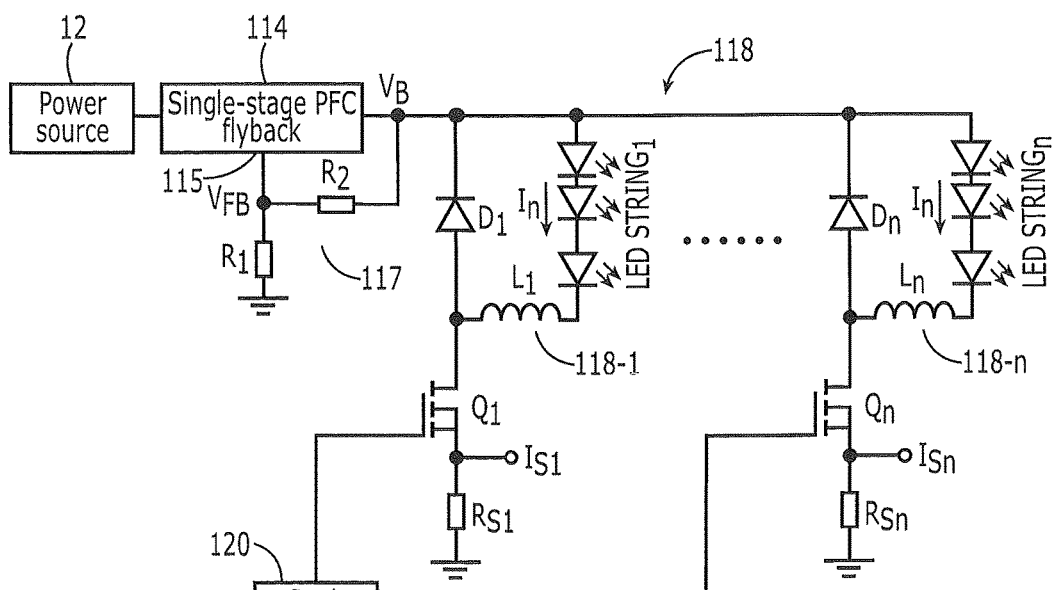
FIG. 5 is a schematic block diagram of the solid state lighting apparatus showing the buck current regulators in more detail.

FIG. 5 shows a more detailed implementation of a buck converter block 118 including multiple buck converters 118-1 to 118-n in a constant current driver circuit. Buck converters 118-1 to 118-n each include an inductor $L_n$, a diode $D_n$, a switch $Q_n$, a current sensing resistor $R_{sn}$ and a buck controller 120. The buck controller 120 regulates the current through each LED string 1 to n by sensing each of the currents $i_1$ to $i_n$ passing through the respective strings and controlling the turn on/off of the switches $Q_1$ to $Q_n$. In order to provide desired driving current for each LED string, buck converters 118-1 to 118-n need an input voltage higher than the maximum voltage of LED strings 1 to n. Since the LED voltage drop is highly dependent on operating temperature, driving current, and manufacture processes, it is not uncommon for an LED string voltage to vary by ±10% from its nominal value. To accommodate the potentially wide range of LED string voltages, the output voltage $V_B$ of the pre-regulator 114 is generally set to a value higher than the maximum expected value of the LED string. In practical applications, the number and types of color of LEDs in string 1 to n may also be different, which makes the voltage difference between the input voltage $V_B$ and minimum LED string voltage even larger. For a buck converter intended for LED lighting application, a larger difference between the input voltage $V_B$ and LED string voltage generally results in a higher power loss, which is not desired for efficient lighting. This will be explained as follows.

The power loss of a buck converter 118-n is primarily a function of the power loss of the diode $D_n$ and the power loss of the switch $Q_n$. The power loss can be expressed by equation (2) below, by assuming the ripple of LED current is negligible, where $P_{BUCK}$ is the power loss due to the diode and switch, $R_{SW}$ is the turn-on resistance of the switch, I is the LED current, D is the ratio of turn-on time to switching period of the switch, and $V_F$ is the forward voltage drop of the diode.

$$P_{BUCK} = R_{SW}I^2D + (1-D)IV_F \quad (2)$$

Figure 6:
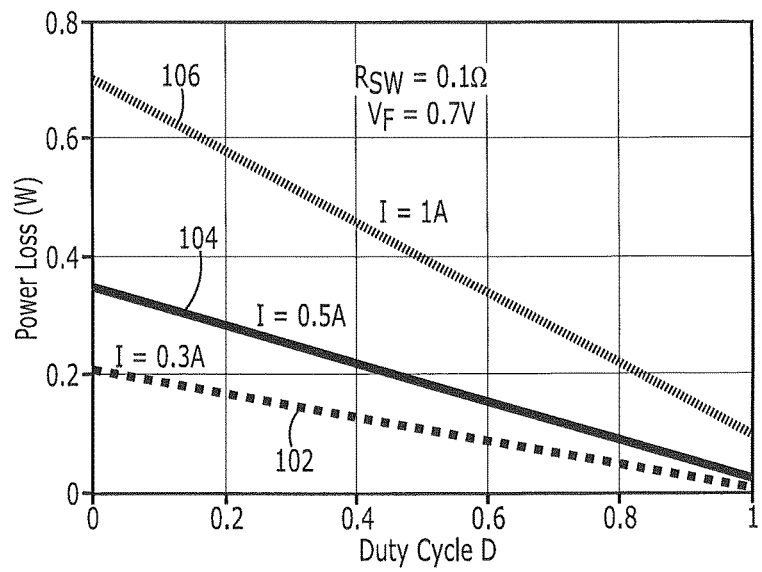
FIG. 6 is a graph of power loss versus duty cycle for an LED driver including a single stage flyback pre-regulator and multiple buck current regulators.

FIG. 6 shows the power loss of a buck converter vs. switching duty cycle for different driving currents. In particular, curve 102 represents the power loss of a buck converter vs. switching duty cycle for a driving current of 0.3 A, curve 104 represents the power loss of a buck converter vs. switching duty cycle for a driving current of 0.5 A, and curve 106 represents the power loss of a buck converter vs. switching duty cycle for a driving current of 1 A for $R_{SW}$=0.1 ohm and $V_F$=0.7V. As can be seen from FIG. 6, the power loss drops as the switching duty cycle D increases. For higher LED currents, the power loss drops more significantly as the switching duty cycle D increases. Therefore, it may be desirable to increase the switching duty cycle D to reduce the power loss of the buck converter and maximize the overall efficiency.

As known by those skilled in the art, the switching duty cycle D is a function of the input voltage and LED string voltage, and can be expressed by Equation (3), where $V_B$ is the output voltage of the pre-regulator 114, i.e., the input voltage of the buck converters 118-1 to 118-n, and $V_{LED}$n is the voltage of the nth LED string.

$$D = \frac{V_{LEDn}}{V_B} \quad (3)$$

From Equation (3), it can be observed that as voltage $V_B$ decreases, the duty cycle D increases and the power loss of the buck converter decreases according to Equation (2) and FIG. 6. In other words, the output voltage $V_B$ of the pre-regulator should be as low as possible to allow the buck converters 118-1 to 118-n to operate with a high switching duty cycle. In practical applications, the maximum switching duty cycle D is limited to around 0.9 (90%), considering the rising and falling time of the switching control signal output by the buck controller 120, and reset time of the inductor core of the inductor $L_n$.

According to some embodiments, an adjustable or adaptive controlled output voltage $V_B$ of the pre-regulator is provided to ensure that voltage $V_B$ tracks the maximum voltage of LED strings and to ensure that the maximum switching duty cycle is around 90%. With an adjustable voltage $V_B$ output by the pre-regulator 114, the power loss of the buck converters 118-1 to 118-n can be reduced, and the overall efficiency of the lighting apparatus can be increased.

Figure 7:
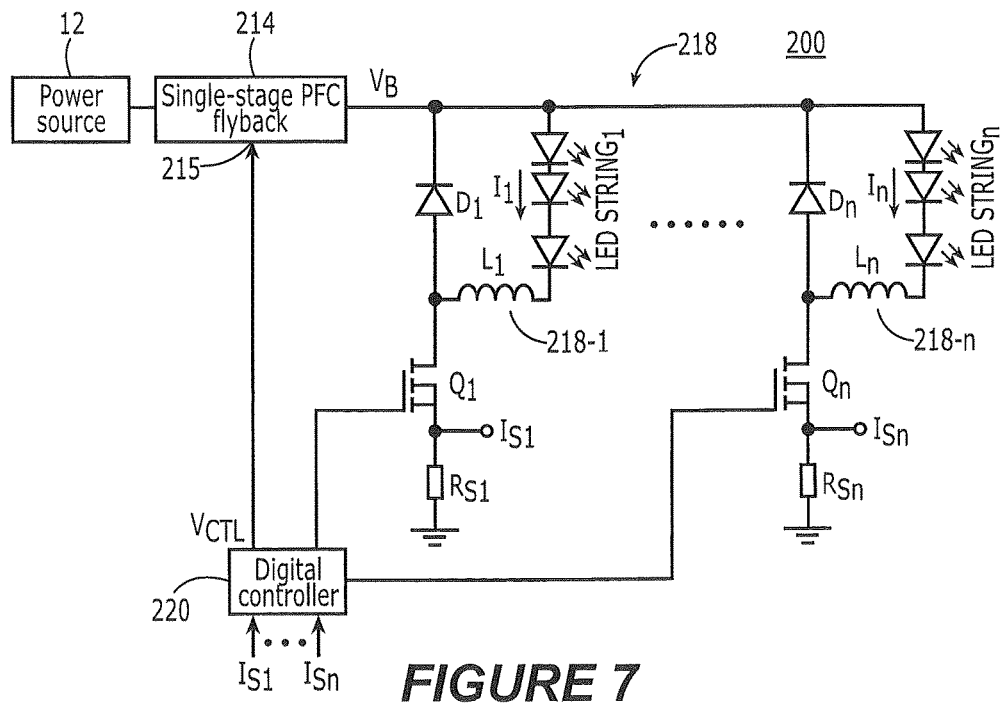
FIG. 7 is a schematic block diagram of a solid state lighting apparatus according to some embodiments.

FIG. 7 shows a lighting apparatus 200 according to embodiments of the inventive concepts. The lighting apparatus 200 includes a power source 12 (which may be DC or AC), a flyback voltage pre-regulator 214 including a feedback input 215, and a buck converter block 218 including a digital controller 220 and buck converters 218-1 to 218-n. Each of the buck converters 218-1 to 218-n includes an inductor $L_n$, a diode $D_n$, a switch $Q_n$, and a current sensing resistor $R_{sn}$. The power source 12 can be a battery or AC voltage from the utility power line, or any other type of power sources. The voltage pre-regulator 214 can be a boost converter, a buck converter, a flyback converter, or any other type of power converter. The LED strings 1 to n may have the same or different numbers and colors of LEDs in series, parallel, or series/parallel arrangements.

The digital controller 220 has multiple tasks. The first task is to regulate the current through each LED string by sensing each of the currents $i_1$ to $i_n$ passing through the strings and controlling the turn on/off of the switches $Q_1$ to $Q_n$ for a given input voltage $V_B$. The second task is to adjust the output voltage $V_B$ of the voltage pre-regulator 214 by sending a desired control signal $V_{CTL}$ to the feedback input 215 of the pre-regulator 214 so that the maximum duty cycle D of the buck converters 218-1 to 218-n stays around 90%. In this way, the efficiency of the buck converters 218-1 to 218-n, hence, the overall efficiency of the lighting apparatus 200 may be increased.

To accomplish this task, the digital controller 220 monitors the duty cycle of the switching signals provided to the transistors Q1 to Qn of the buck converters 218-1 to 218-n. If the highest duty cycle of the switching signals is below a first predetermined threshold value, e.g. 80%, 85%, etc., the digital controller 220 may reduce the level of the control signal $V_{CTL}$ that is provided to the feedback input of the pre-regulator 215. As explained above in connection with Equation (1), reducing the signal at the feedback input 215 of the pre-regulator 214 reduces the voltage $V_B$ output by the pre-regulator 214.

As further explained above in connection with Equation (3), reducing the voltage $V_B$ increases the duty cycle of the buck converters 218-1 to 218-n, which correspondingly decreases the power consumed by the circuit. Once the highest duty cycle of the switching signals has reached a second predetermined threshold, the digital controller 220 may maintain the level of the control signal $V_{CTL}$.

The second threshold may be greater than the first threshold so that there is some hysteresis built into the system. For example, the first threshold may be 80% and the second threshold may be 85%. Thus, the controller 220 may not start to regulate the voltage $V_B$ until the highest duty cycle of the switching signals drops below 80%, and may not stop regulating the voltage $V_B$ until the highest duty cycle of the switching signals rises above 85%.

Figure 8:
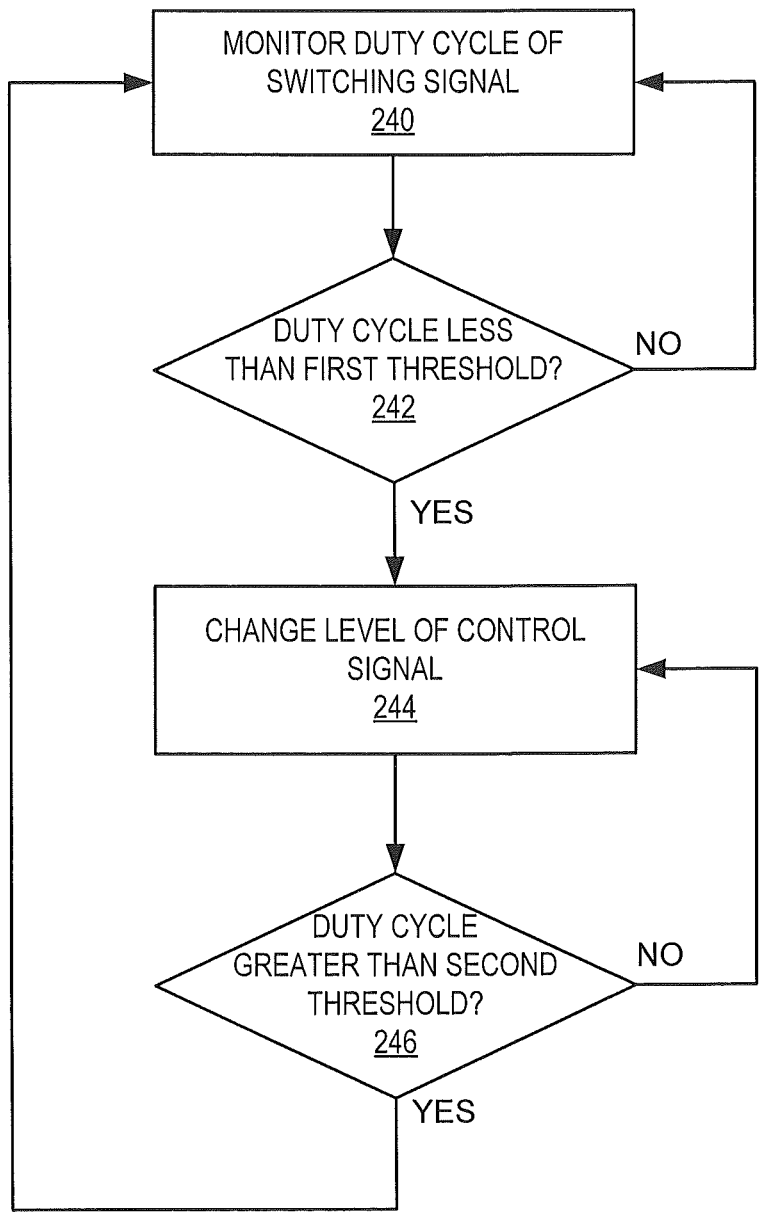
FIG. 8 is a flowchart of operations of a current driver according to some embodiments.

FIG. 8 is a flowchart that illustrates operations of a digital controller 220 according to some embodiments. As shown therein, the digital controller monitors a duty cycle of a switching signal provided to a converter circuit (block 240). At block 242, the controller 220 checks to see if the duty cycle of the switching signal is less than a first threshold. In some embodiments, the controller 220 may check to see if the highest duty cycle of a plurality of duty cycles of switching signals provided to a plurality of converters is less than the first threshold.

If not, operations return to block 240, and the controller 220 continues to monitor the duty cycle(s) of the switching signal(s).

If the duty cycle drops below the first threshold, then operations proceed to block 244, where the controller 220 changes the level of the control signal applied to the pre-regulator 214 to cause a voltage output by the pre-regulator 214 to become lower. In some embodiments, the controller 220 may reduce a voltage level of the control signal applied to the pre-regulator 214. In other embodiments, the control signal may be changed in some other way depending on the design of the pre-regulator 214. For example, in some embodiments a voltage level of the control signal may be increased, a frequency of the control signal may be changed, a duty cycle of the control signal may be changed, a digital value output as the control signal may be changed, etc.

Operations then proceed to block 246, where the controller 220 checks to see if the duty cycle of the switching signal exceeds a second threshold. If not, then the controller 220 may continue to adjust the control signal at block 244. Otherwise, if the duty cycle of the switching signal exceeds the second threshold, operations may return to block 240.

A third task of the digital controller 220 may include detection of faults, such as over temperature, short-circuit, open-circuit, etc., and protection of the lighting apparatus 200 in the event of such a fault.

Figure 9:
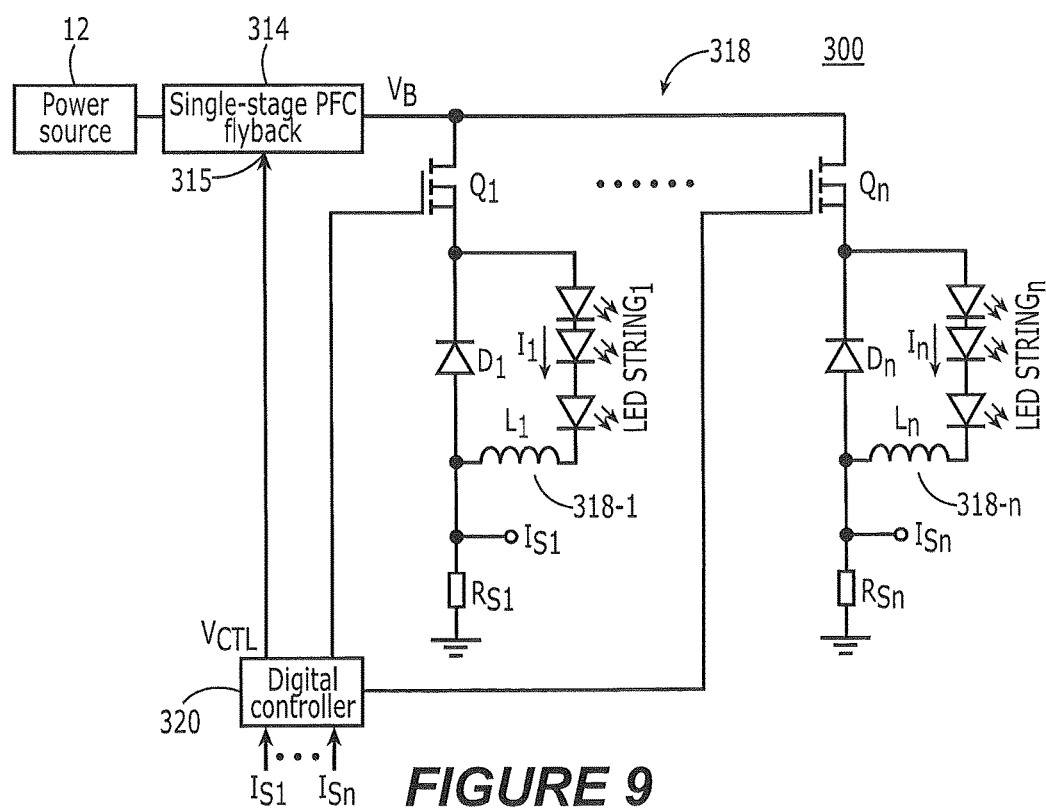
FIGS. 9-11 are schematic block diagrams of solid state lighting apparatus according to further embodiments.

FIG. 9 shows a lighting apparatus 300 according to further embodiments of the inventive concepts. The lighting apparatus 300 includes a power source 12, a voltage pre-regulator (e.g. a flyback) 314, and a buck converter block 318 including a digital controller 320, and a buck converters 318-1 to 318-n. Each of the buck converters 318-1 to 318-n includes an inductor $L_n$, a diode $D_n$, a switch $Q_n$, and a current sensing resistor $R_{sn}$. In the embodiments of FIG. 8, switches Q1 to Qn are arranged to be close to the output of the voltage pre-regulator. That is, the switches $Q_1$ to $Q_n$ are connected between the output node of the pre-regulator 314 at which the voltage $V_B$ is supplied and the cathode terminals of the diodes $D_1$ to $D_n$.

Figure 10:
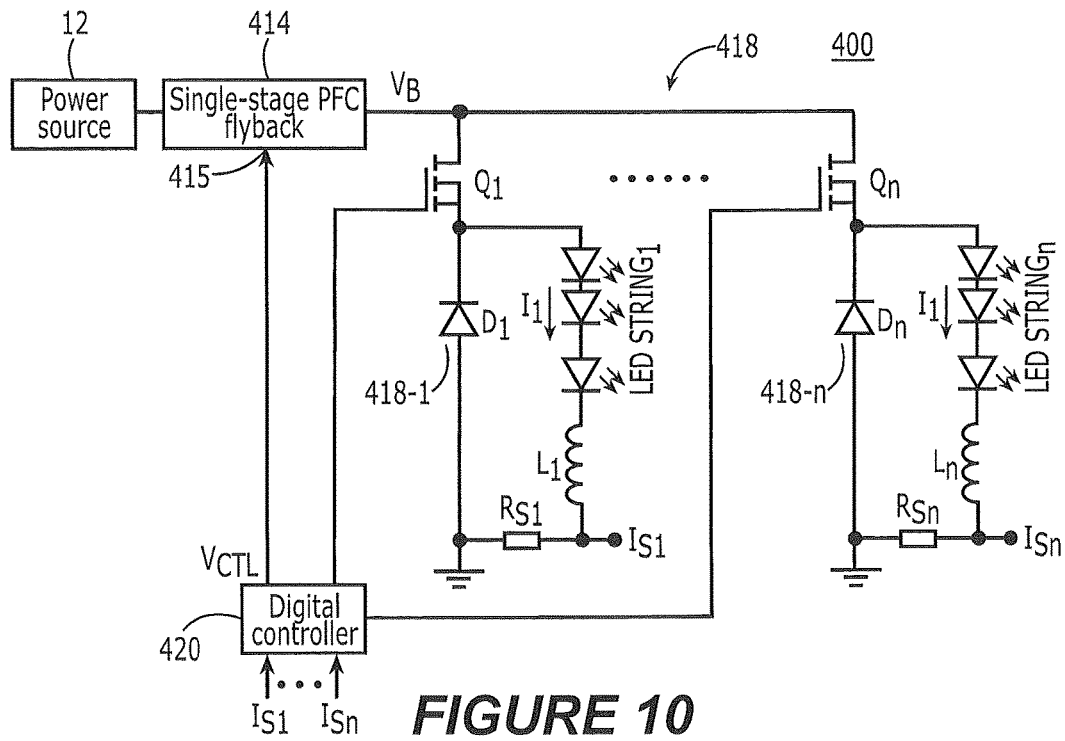

FIG. 10 shows a lighting apparatus 400 according to still further embodiments of the inventive concepts. The lighting apparatus 400 includes a power source 12, a voltage pre-regulator (e.g. a flyback) 414, and a buck converter block 418 including a digital controller 420 and buck converters 418-1 to 418-n. Each of the buck converters 418-1 to 418-n includes an inductor Ln, a diode Dn, a switch Qn, and a current sensing resistor Rsn.

In the embodiments of FIG. 10, switches $Q_1$ to $Q_n$ are also arranged to be close to the output terminal of the voltage pre-regulator 414, but the anode of each diode ($D_1$ to $D_n$) is connected directly to ground rather than being connected to ground through the current sensing resistor Rsn. Therefore, the current sensing resistors Rsn see the entire current of the LEDs within each switching cycle of the switches, which may result in more power loss.

Figure 11:
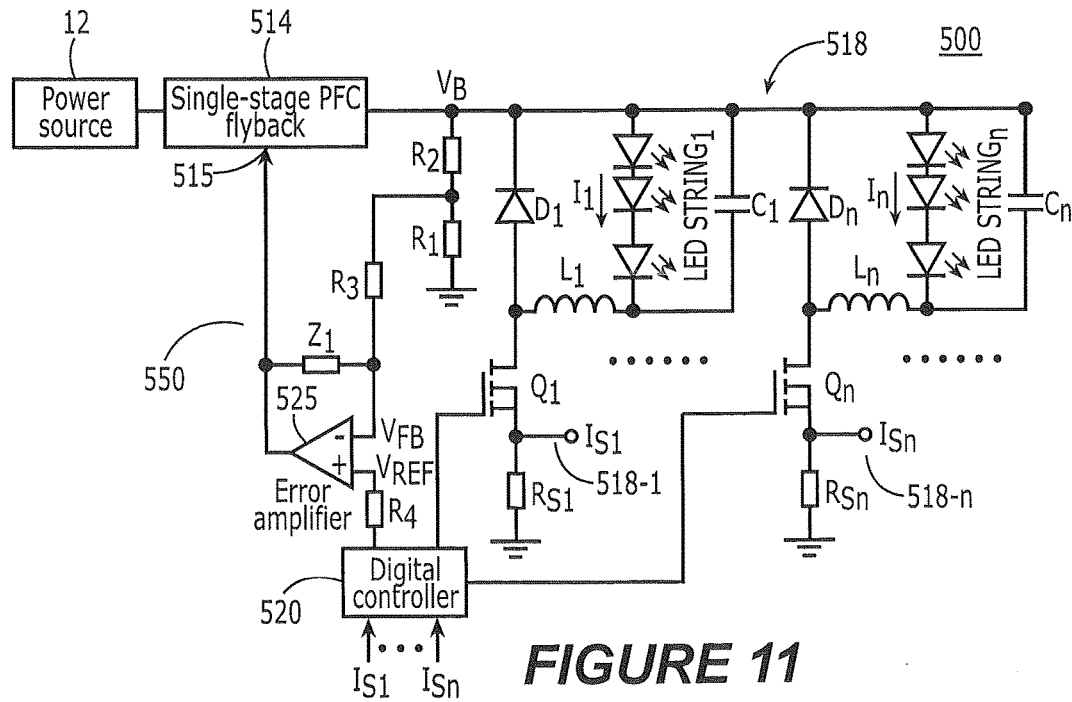

FIG. 11 shows a lighting apparatus 500 according to still further embodiments of the inventive concepts. The lighting apparatus 500 includes a power source 12, a voltage pre-regulator (e.g. a flyback) 514, and a buck converter block 518 including a digital controller 520 and buck converters 518-1 to 518-n. Each of the buck converters 518-1 to 518-n includes an inductor Ln, a diode Dn, a switch Qn, and a current sensing resistor Rsn.

The apparatus 500 additionally includes a control signal generating circuit 550 that generates the control signal $V_{CTRL}$ that controls the level of the voltage $V_B$ output by the pre-regulator 514. The control signal generating circuit 550 is connected to the digital controller 520 and includes an error amplifier 525, resistors $R_1$ to $R_4$, and an impedance $Z_1$.

In the circuit of FIG. 11, the error amplifier 525 compares a sensed output voltage $V_{FB}$ with a reference voltage $V_{REF}$ generated by the digital controller 520. By controlling $V_{REF}$, $V_B$ may be adjusted and regulated according to Equation (1). Since $V_{REF}$ is adjustable by the digital controller, $V_B$ can be increased or decreased so that the maximum switching duty cycle D meets the target value, e.g., 90%.

In some embodiments, capacitors $C_1$ to $C_n$, may be placed across the LED strings to reduce the ripple current through the LEDs, as shown in FIG. 11.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the disclosure. As used herein, the term "and/or" includes any and all combinations of one or more of the associated listed items.

The terminology used herein is for the purpose of describing particular embodiments only and is not intended to be limiting of the inventive concepts. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed typical embodiments and, although specific terms are employed, they are used in a generic and descriptive sense only and not for purposes of limitation, the scope of the inventive concepts being set forth in the following claims.

What is claimed is:

1. A power supply circuit, comprising:
   a voltage regulator configured to receive an input voltage and to generate an output voltage;
   a switching current regulator coupled to an output of the voltage regulator and configured to regulate a level of current supplied to an output load, wherein the switching current regulator is controlled by a switching signal having a duty cycle; and
   a controller configured to generate the switching signal;
   wherein the controller is configured to monitor the duty cycle of the switching signal and to control a level of the output voltage generated by the voltage regulator in response to a comparison between a threshold value and the duty cycle of the switching signal;
   wherein the voltage regulator is configured to receive a control signal and set the level of the output voltage in response to the control signal and the controller is configured to supply the control signal to the voltage regulator and to control the level of the output voltage by changing a level of the control signal; and
   wherein the controller is configured to reduce the level of the output voltage generated by the voltage regulator in response to the comparison, wherein the comparison indicates that the duty cycle of the switching signal is below the threshold value;
   wherein the threshold value comprises a first threshold value, and wherein the controller is further configured:
   to compare the duty cycle of the switching signal to a second threshold value that is higher than the first threshold value; and
   to stop reducing the level of the output voltage in response to determining that the duty cycle of the switching signal is greater than the second threshold value, wherein the first threshold value and the second threshold value provide hysteresis in the control of the output voltage level.

2. The power supply of claim 1, wherein the first threshold value is lower than the second threshold value.

3. The power supply of claim 1, wherein the controller is configured to reduce the level of the control signal in response to determining that the duty cycle of the switching signal is below the first threshold value.

4. The power supply of claim 1, wherein the switching current regulator comprises:
   a switch having a control terminal that is configured to receive the switching signal;
   a diode coupled between the switch and the output of the voltage regulator;
   an inductor coupled between the switch and the output load; and
   a current sensing resistor coupled between the switch and a ground terminal.

5. The power supply of claim 1, wherein the switching current regulator comprises:
   a switch having a control terminal that is configured to receive the switching signal and having a first terminal coupled to the output of the voltage regulator and having a second terminal coupled to the output load;
   a diode coupled to the second terminal of the switch;
   an inductor coupled between the diode and the output load; and
   a current sensing resistor coupled between the inductor and a ground terminal.

6. The power supply of claim 1, wherein the switching current regulator comprises:
   a switch having a control terminal that is configured to receive the switching signal and having a first terminal coupled to the output of the voltage regulator and having a second terminal coupled to the output load;
   a diode coupled to the second terminal of the switch and to a ground terminal;
   an inductor coupled to the output load; and
   a current sensing resistor coupled between the inductor and a ground terminal.

7. The power supply of claim 1, further comprising:
   a voltage divider coupled to the output of the voltage regulator and configured to generate a feedback voltage $V_{FB}$; and
   an error amplifier configured to compare a reference voltage $V_{REF}$ generated by the controller to the feedback voltage $V_{FB}$ and to responsively generate a control signal, wherein an output of the error amplifier is coupled to a feedback input of the voltage regulator, and wherein the voltage regulator is configured to set the level of the output voltage in response to the control signal.

8. The power supply of claim 7, wherein the controller is configured to generate the reference voltage $V_{REF}$ in response to the duty cycle of the switching signal.

9. The power supply of claim 1, wherein the voltage regulator comprises a single stage power factor correcting flyback and the switching current regulator comprises a buck current regulator.

10. A power supply circuit, comprising:
    a voltage regulator configured to receive an input voltage and to generate an output voltage;
    a plurality of switching current regulators coupled to an output of the voltage regulator and configured to regulate levels of current supplied to respective output loads, wherein the switching current regulators are controlled by switching signals having respective duty cycles; and
    a controller configured to generate the switching signals;
    wherein the controller is configured to monitor the duty cycles of the switching signals and to control a level of the output voltage generated by the voltage regulator in response to performing a comparison between a highest one of the duty cycles of the switching signals and a threshold value;
    wherein the voltage regulator is configured to receive a control signal and set the level of the output voltage in response to the control signal and the controller is configured to supply the control signal to the voltage regulator and to control the level of the output voltage by changing a level of the control signal; and
    wherein the controller is configured to reduce the level of the output voltage generated by the voltage regulator in response to the comparison, wherein the comparison indicates that the highest one of the duty cycles of the switching signals is below the threshold value;
    wherein the threshold value comprises a first threshold value, and wherein the controller is further configured:

to compare the duty cycles of the switching signals to a second threshold value that is higher than the first threshold value; and to stop reducing the level of the output voltage in response to determining that the highest one of the duty cycles of the switching signals is greater than the second threshold value, wherein the first threshold value and the second threshold value provide hysteresis in the control of the output voltage level.

11. A method of operating a power supply circuit including a voltage regulator that receives an input voltage and generates an output voltage and a switching current regulator that regulates a level of current supplied to an output load and that is controlled by a switching signal having a duty cycle, the method comprising:

monitoring the duty cycle of the switching signal;

performing a comparison between the duty cycle of the switching signal and a threshold value; and controlling a level of the output voltage generated by the voltage regulator in response to the comparison;

wherein the voltage regulator is configured to receive a control signal and to set the level of the output voltage in response to the control signal, the method further comprising:

supplying the control signal to the voltage regulator;

controlling the level of the output voltage by changing a level of the control signal; and changing the level of the control signal to reduce the level of the output voltage generated by the voltage regulator in response to determining that the duty cycle of the switching signal is below the threshold value;

wherein the threshold value comprises a first threshold value, the method further comprising:

comparing the duty cycle of the switching signal to a second threshold value that is higher than the first threshold value; and controlling the level of the control signal to stop reducing the level of the output voltage in response to determining that the duty cycle of the switching signal is greater than the second threshold value, wherein the first threshold value and the second threshold value provide hysteresis in the control of the output voltage level.

12. The method of claim 11, further comprising:

controlling the level of the control signal to decrease the level of the output voltage in response to determining that the duty cycle of the switching signal is not greater than the second threshold value.

\* \* \* \* \*